(12) United States Patent
Schechter et al.

(10) Patent No.: US 9,251,268 B2
(45) Date of Patent: Feb. 2, 2016

(54) AUTOMATED TARGET SPECIFIC FORMAT CONVERSION OF CONTEXT INFORMATION FROM A USER QUERY

(75) Inventors: Greg Schechter, Seattle, WA (US); Severan Sylvain Jean-Michel Rault, Redmond, WA (US); Graham Arthur Wheeler, Redmond, WA (US); Loic Deniel, Bellevue, WA (US); Roman Waupotitsch, Redmond, WA (US); Lawrence Brian Ripsher, Seattle, WA (US); Sameer Vijay Bhangar, Seattle, WA (US); Hui Leng Caren Quah, Bellevue, WA (US); Jason Peter Johnson, Redmond, WA (US); Zhaowei Jiang, Palo Alto, CA (US); Marc Benjamin Phillips, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 628 days.

(21) Appl. No.: 12/958,167

(22) Filed: Dec. 1, 2010

(65) Prior Publication Data

US 2012/0144281 A1   Jun. 7, 2012

(51) Int. Cl.
G06F 17/00 (2006.01)
G06F 17/30 (2006.01)

(52) U.S. Cl.
CPC ...... *G06F 17/30867* (2013.01); *G06F 17/3041* (2013.01); *G06F 17/30861* (2013.01)

(58) Field of Classification Search
CPC .......... G06F 17/30861; G06F 17/3043; G06F 17/30867

USPC .......... 715/205, 224, 226, 234; 707/732, 733, 707/734, 769, 779, E17.014
IPC .................................................. G06F 3/20,3/30
See application file for complete search history.

(56) References Cited

U.S. PATENT DOCUMENTS

| 5,956,483 | A | 9/1999 | Grate et al. |
| 7,107,536 | B1 | 9/2006 | Dowling |
| 7,788,251 | B2 | 8/2010 | Carlson et al. |
| 8,024,384 | B2 * | 9/2011 | Prabhakar et al. ............ 707/709 |

(Continued)

OTHER PUBLICATIONS

"International Search Report", Mailed Date: Jul. 16, 2012, Application No. PCT/US2011/061570, Filed Date: Nov. 20, 2011, pp. 9.

(Continued)

*Primary Examiner* — Cesar Paula
*Assistant Examiner* — Mohammed-Ibrahim Zuberi
(74) *Attorney, Agent, or Firm* — Jessica Meyers; Tom Wong; Micky Minhas

(57) ABSTRACT

Providing context to a target minimizes the amount of information that a user must input. Context transfer pages receive context and reformat for the target. Selection of links to such pages provide context which is then reformatted and provided to the target to pre-populate information for the user. A return link can be specified to enable the target to return further context upon user interaction completion. The return link can specify further context transfer pages which can use the returned context to direct the performance of convenience actions, including invoking other applications on the user's computing device and entering information into them. The context transfer pages can themselves collect information from the user to provide appropriate interfaces without requiring resource investment from the target.

21 Claims, 4 Drawing Sheets

(56) References Cited

U.S. PATENT DOCUMENTS

| | | |
|---|---|---|
| 2003/0135582 A1 | 7/2003 | Allen et al. |
| 2004/0054691 A1 | 3/2004 | Sharma et al. |
| 2004/0221231 A1 | 11/2004 | Madril et al. |
| 2005/0041667 A1* | 2/2005 | Miller et al. .............. 370/395.4 |
| 2005/0282532 A1 | 12/2005 | Dotan et al. |
| 2006/0023688 A1 | 2/2006 | Kilian-Kehr et al. |
| 2006/0095538 A1 | 5/2006 | Rehman et al. |
| 2007/0192166 A1* | 8/2007 | Van Luchene ................. 705/10 |
| 2008/0005067 A1 | 1/2008 | Dumais et al. |
| 2008/0126961 A1* | 5/2008 | Naaman et al. .............. 715/764 |
| 2009/0198662 A1 | 8/2009 | Prabhakar et al. |
| 2009/0204600 A1* | 8/2009 | Kalik et al. ....................... 707/5 |
| 2011/0302521 A1* | 12/2011 | Jiang et al. .................... 715/779 |
| 2012/0173520 A1* | 7/2012 | Wu et al. ....................... 707/723 |

OTHER PUBLICATIONS

"URL-Rewrite—Rewrite (X)HTML attributes with Common Lisp", Retrieved at << http://www.weitz.de/url-rewrite/ >>, Retrieved Date: Sep. 24, 2010, pp. 3.

"State Intellectual Property Office of People's Republic China Search Report", Mailed Date: Nov. 21, 2013, Application No. 201110394174.7, Filed Date: Dec. 1, 2011, pp. 3.

* cited by examiner

AUTOMATED TARGET SPECIFIC FORMAT CONVERSION OF CONTEXT INFORMATION FROM A USER QUERY

BACKGROUND

As a result of increases in the processing, display and communicational abilities of mobile computing devices, users of such mobile computing devices increasingly use them to perform a greater quantity of tasks. For example, in addition to traditional voice communication functions and network browsing functions, mobile computing devices are increasingly utilized to perform more complex network-based tasks, such as, for example, making restaurant reservations, buying movie tickets, making travel arrangements and other like tasks. However, while the processing, communicational and display abilities of mobile computing devices make such tasks possible, they still remain impractical simply due to the amount of information that is often required to be entered, by the user, through the data entry mechanisms of the mobile device. In addition, many of the interfaces for such tasks do not take into consideration the limited display space on mobile devices, resulting in an interface that is impractical to navigate on mobile devices.

Traditional mobile computing devices typically do not comprise full-size data entry peripherals, such as, for example a full-size keyboard. Instead, mobile computing devices typically comprise either miniaturized keyboards, which are only a small fraction of the size of a full-size keyboard, or virtual keyboards, that are merely images displayed upon a screen. Such keyboards are limited in size due to the physical constraints of the mobile computing device, which is typically designed to fit comfortably in a user's hand and be able to be carried in a pocket, belt holster, purse or the like. Such physical limitations, however, result in keyboards that are simply too small to enable a user to type, or otherwise enter information, as efficiently as they could utilizing, for example, a full-size keyboard. In theory, physical limitations of mobile computing device's input peripherals can be overcome through voice input, where a user simply speaks commands or input data. However, voice input is impractical for entering information into complex templates, and further suffers from inaccuracy drawbacks, thereby again relegating a user to input peripherals such as the miniaturized or virtual keyboards. Consequently, when attempting to do tasks that require the user to enter a lot of information, such as via a keyboard of the mobile computing device, users can often become frustrated and can seek to delay such activity until they have access to a physically larger computing device, or, at least, a physically larger data entry peripheral that they can communicationally couple with the mobile computing device.

SUMMARY

In one embodiment, to minimize the amount of information that a user has to manually enter, context can be obtained from prior actions or other information about the user that may be available and that context can be passed to a target service so that at least some information required by the target service is automatically filled in for the user, thereby saving the user the effort of doing so themselves. Such an embodiment can be especially useful within the context of mobile computing devices, or other computing devices, whose physical characteristics limit the amount of information that can be conveniently entered by a user.

In another embodiment, context transfer pages can be established and links to such pages can be provided to a user, such as, for example, in response to a query or search terms that the user entered. Selection of such links, by the user, can enable context to be obtained, such as, for example, from the query or search terms that the user entered, and then passed on to a particular target in a manner appropriate for that target. Such context transfer pages can either be in accordance with a standard, such that they provide context to a target in a manner appropriate for that target due to compliance with a standard, or, alternatively, such context transfer pages can be target-specific context transfer pages that are specifically tailored to accept context for, and provide context to, a specific target in a manner appropriate for that specific target.

In a further embodiment, when passing context to a target, a return link, or other identifier, can be specified. The target, upon completion of an activity, with the user, can utilize such a return link to return further context, such as, for example, a confirmation number or other information relevant to the activity that the user performed with the target. The return link can enable the returned context to be utilized to automatically perform convenience actions for the user, such as on a mobile computing device. The convenience actions can include entering information into a calendar application, notifying one or more individuals, or other like convenience actions, again, minimizing the amount of information that the user is required to enter through potentially limiting physical interfaces.

In a still further embodiment, context transfer pages can themselves request that the user enter a desired set of information prior to forwarding such information to the target, thereby enabling the target to provide a simplified user interface, such as, for example, one that would be appropriate for mobile computing devices, without the target investing the necessary resources to develop such an interface itself.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

Figure 1:
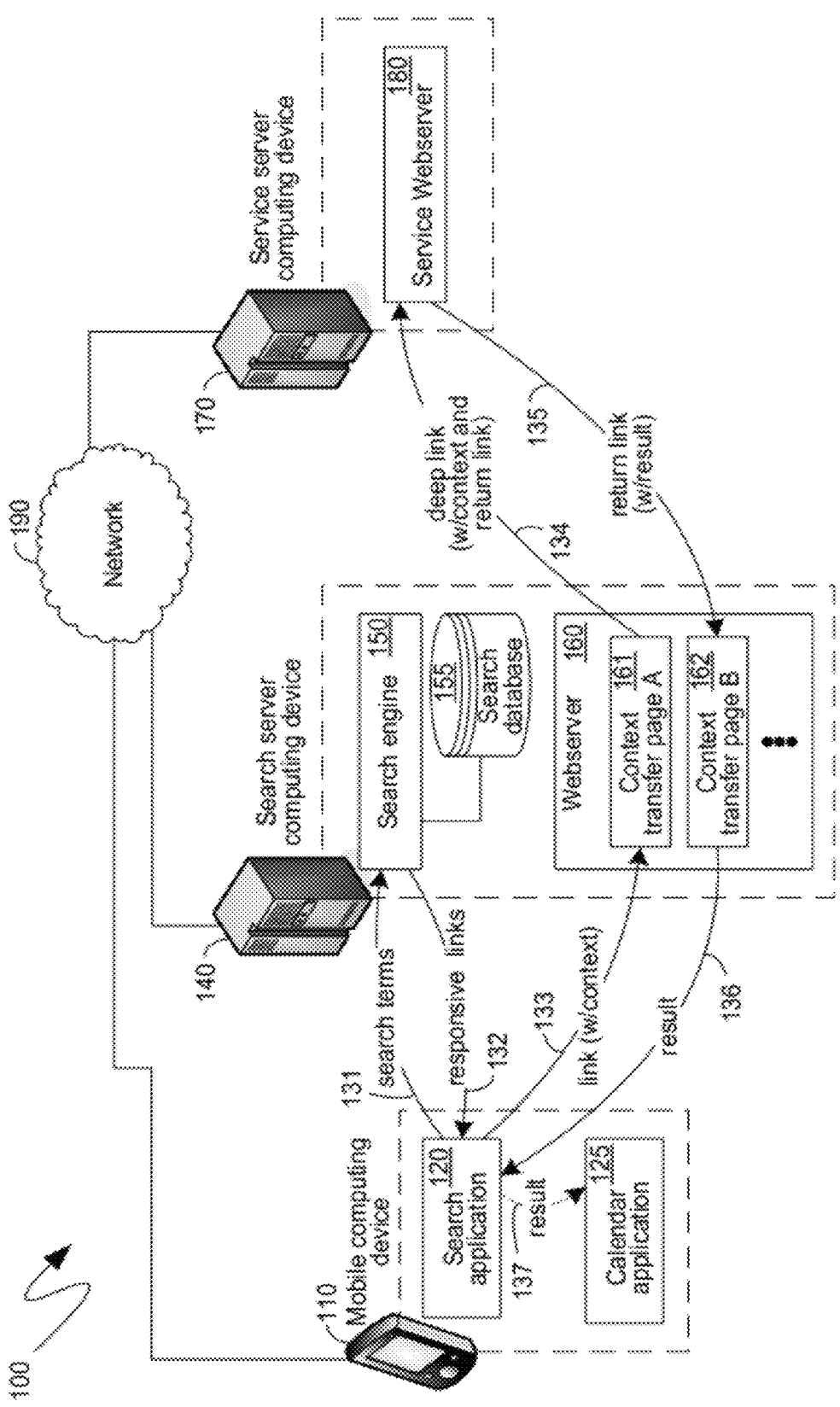
FIG. 1 is a block diagram of an exemplary network of computing devices.

The following description relates to the provision of context to a target to enable a user to interact with the target while minimizing the amount of information that the user must input, thereby saving the user from inputting information through potentially limited user input peripherals or entry mechanisms. Context transfer pages can be created in accordance with specific aspects, attributes and formatting associated with a target. Links to such context transfer pages can be provided to a user, such as, for example, when a user enters a search query or other search terms to which the target would be responsive. Selection of one or more such links by the user can enable the context transfer pages to obtain context from the search query entered by the user, or any other information associated with the user that may be known or available to the mechanism utilized by the user to select such links. The context transfer pages can then provide such context to the target in a manner appropriate to the target, such that various information requested, or required, by the target can already be filled in for the user. The context transfer pages can also specify a return link that the target can utilize to return further context after its interactions with the user have completed, such as, for example, a confirmation number. The return link can specify further context transfer pages which can receive the returned context and can use it to direct the performance of convenience actions for the user, such as, for example, entering appropriate information into a calendar, notifying individuals, or other like convenience actions associated with the interaction the user had with the target. Furthermore, the context transfer pages can themselves collect information directly from the user, thereby enabling a target to provide interfaces appropriate for the user's computing environment without investing the resources to do so.

For purposes of illustration, the techniques described herein make reference to existing and known networking infrastructure, such as the ubiquitous Internet and World Wide Web (WWW). Also for purposes of illustration, the techniques described herein make reference to existing and known protocols and languages, such as the ubiquitous HyperText Transfer Protocol (HTTP) and the equally ubiquitous HyperText Markup Language (HTML). Such references, however, are strictly exemplary and are not intended to limit the mechanisms described to the specific examples provided. Indeed, the techniques described are applicable to any reuse of existing functionality within the context of requests and responses provided through network protocols.

Although not required, the description below will be in the general context of computer-executable instructions, such as program modules, being executed by a computing device. More specifically, the description will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including hand-held devices, multi-processor systems, microprocessor based or programmable consumer electronics, network PCs, minicomputers, mainframe computers, and the like. Similarly, the computing devices need not be limited to stand-alone computing devices, as the mechanisms may also be practiced in distributed computing environments where tasks are performed by remote processing devices that are linked through a communications network. In a distributed computing environment, program modules may be located in both local and remote memory storage devices.

Turning to FIG. 1, an exemplary system 100 is shown, comprising a client computing device 110, two server computing devices, namely the server computing devices 140 and 170, and the network 190 enabling communications between two or more of the client computing device 110 and the server computing devices 140 and 170. Although illustrated as separate server computing devices 140 and 170, the mechanisms described herein are equally applicable to independent processes executing on a single server computing device, or for configurations in which components in device 140 are split among different servers. The mechanisms described herein are also applicable to virtualized server computing devices, such as can be created by one or more processes executing on either a single physical computing device or across multiple physical computing devices. Server computing devices 140 and 170, therefore, are meant to represent not just physical server computing devices, but also virtualized server computing devices, or any other like independent executing processes. As will be described below, the system 100 of FIG. 1 further comprises web servers 160 and 180 executing on the server computing devices 140 and 170, respectively. Again, such nomenclature is utilized for descriptive clarity and to provide a common basis of understanding, and is not intended to limit the descriptions provided herein strictly to the WWW and web-centric environment illustrated and referenced.

For purposes of the descriptions below, the client computing device 110 will be illustrated as, and referenced as, a mobile computing device, such as, for example, a cellular telephone, a personal digital assistant, a tablet, or other like mobile computing device that is typically communicationally coupled to the network 190 via a wireless connection. Although the mechanisms described in detail below are equally applicable to any type of computing device, it is likely that they will serve the greatest utility within the context of mobile computing devices, which, due to their physical limitations often provide sub-optimal user input entry mechanisms. For example, as indicated previously, mobile computing devices are typically constrained as to their physical size, due to the desirability that such computing devices be as small as practical. Consequently, mobile computing devices typically do not comprise full-size keyboards or other equivalent user input entry mechanisms or peripherals. Instead, mobile computing devices typically comprise reduced-size keyboards or virtual keyboards whose keys are displayed on a display of the mobile computing device. In either case, such keyboards, due to their physical size, can be difficult for users with average-sized fingers to enter information efficiently. Consequently, mechanisms, such as those described in detail below, that save a user from entering, or re-entering, certain information, can be especially beneficial within the context of mobile computing devices.

The mobile computing device 110, of the system 100 shown in FIG. 1, is illustrated as comprising a search application 120 and a calendar application 125. In one embodiment, the search application 120 can be a dedicated application that executes natively on the mobile computing device 110, and that provides a user of the mobile computing device 110 the ability to search the network 190, or otherwise provides a mechanism through which a user of the mobile computing device 110 can access one or more services being offered via the network 190. In an alternative embodiment, however, the search application 120 can be a general-purpose network browser that can simply be directed to, or otherwise utilize, a search service, such as that which could be provided by the search server computing device 140, which will be described in further detail below. Irrespective of whether the search application 120 is a native application or a general-purpose browser, the search application 120 can communicate with a search engine 150 that can be hosted by one or more server computing devices, such as the search server computing device 140.

A user of the mobile computing device 110 can utilize the search application 120 to search for information and services offered via the network 190 or to otherwise transmit a query to which the user seeks a response. The information entered into the search application 120, by the user of the mobile computing device 110, such as, for example, search terms, can be transmitted to the search engine 150 that is being executed by the search server computing device 140, as illustrated by the communication 131, shown in the system 100 of FIG. 1. Subsequently, the search engine 150 can reference a search database 155, such as in a manner well known to those skilled in the art, to identify one or more responsive entities that are accessible via the network 190. Typically, such responsive entities are identified by links, or other identifiers, through which the mobile computing device 110 could communicate with those responsive entities via the network 190. Such responsive links can then be returned to the search application 120, by the search engine 150, via the communication 132 also shown in the system 100 of FIG. 1.

In one embodiment, the search database 155, or another database similarly communicationally coupled to the search engine 150, can comprise a listing of context transfer pages. In such an embodiment, when the search engine 150 identified an entity responsive to the search terms provided, the search engine 150 could further determine whether one or more context transfer pages were associated with that particular entity. If the search engine 150 identified one or more context transfer pages associated with an entity that the search engine 150 had previously determined was responsive to the query it had received, the search engine 150 could return links, or identifiers, not to the responsive entity itself, but rather to the context transfer pages that it had identified. Thus, in such an embodiment, at least some of the responsive links returned to the search application 120, by the search engine 150, via the communication 132, can be links to one or more context transfer pages that are associated with a network accessible entity that was deemed to be responsive to the query, or other information, that was received from the search application 120 via the communication 131. Others of the links returned by the search engine 150, via the communication 132, can be more traditional links directly to responsive content, including, for example, responsive textual content, responsive map content, and the like.

Subsequently, the search application 120 can present the responsive links, received by the communication 132, to a user of the mobile computing device 110. Should the user select one or more of the presented links, the search application 120 can, following the link provided, pass context to the linked-to context transfer page. In one embodiment, the context transfer pages can be hosted by the same entity as that providing the search engine 150. Thus, as shown in the system 100 of FIG. 1, the search server computing device 140 can further comprise a web server 160 that can host one or more context transfer pages, such as the context transfer pages 161 and 162. The invocation of a link to such context transfer pages can result in a communication, such as the communication 133, from the search application 120 to one of the context transfer pages, such as the context transfer page 161.

In one embodiment, the link to the context transfer page 161 can comprise not only an identification of the context transfer page 161 itself, but can further comprise parameters and associated values that can pass context from the search application 120 to the context transfer page 161. For example, the link to the context transfer page 161 can be in the form of: http://www.searchservice.com/context_transfer_page.html?context1=value&contex2=value where the "www.searchservice.com/context_transfer_page.html" can represent an identifier of the context transfer page 161 itself, such as could be utilized to identify and locate the context transfer page 161 within the network 190, and the "context1=value&contex2=value" terms can represent name/value pairs that can transfer context from the search application 120 to the context transfer page 161. In other embodiments, rather than passing context through the specification of name/value pairs in the link, the passed context information can be included in other components of the request, including, for example, the header or the body of the request. Similarly, in other embodiments, rather than specifying contextual information in the form of name/value pairs, the contextual information can be specified in a particular order, through tagging or other metadata or other formatting.

Among the content that can be transferred, such as through the specification of appropriate values in name value pairs, can be information that the search application 120 is aware of, information that was utilized by the search engine 150, or any combination thereof. For example, the context transferred via the communication 133 can comprise some or all of the search terms, or other aspects of the search query, that were originally transmitted from the search application 120, to the search engine 150, via the communication 131, that was described previously. Additionally, the context transferred via the communication 133 can comprise information associated with the search results that were provided via the communication 132, such as the name and other aspects of any services that were identified as responsive. As another example, the context transferred via the communication 133 can further comprise information that can have been obtained from prior searches, such as, for example, the search terms or other query utilized in those prior searches, or the results received from, or otherwise associated with, that prior search. As a further example, the context transferred via the communication 133 can further comprise context that the search application 120 can derive from other aspects of the mobile computing device 110 or that the search application 120 can have stored, for its own use, on the mobile computing device 100. For example, the application 120 can obtain, from other aspects of the mobile computing device 110, information regarding a current location of the mobile computing device, such as from a Global Positioning System (GPS) unit of the mobile computing device 110. In such an example, the search application 120 can utilize such GPS information to localize the results received from the search engine 150, or, alternatively, the search application 120 can provide such GPS information to the search engine 150 and can enable the search engine 150 to localize its results prior to transmitting those results back to the search application 120. As another example, the search application 120 can be aware of the user's home phone number, home address, email address, or even credit card number. As will be recognized by those skilled in the art, such information is typically "auto-filled", such as by initially being provided by the user together with a request, by the user, for the search application 120 to "remember" that information so as to pre-populate appropriate information requests with that information in the future.

In one embodiment, context transfer pages, such as the context transfer pages 161 and 162, can be target-specific context transfer pages that can comprise scripts, code or other information that can accept the context provided and then reformat such context in a manner appropriate for the specific target to which the communications will ultimately be directed. For example, if the target-specific context transfer page were associated with a service, available via the network 190, that enables a user to purchase movie tickets, information regarding the particular movie selected, the theater at which such movie was being shown, and a particular time can all be required by such a movie ticket purchasing service. Similarly, as another example, if a target-specific context transfer page were associated with a different service, also available via the network 190, that enables a user to make restaurant reservations, information regarding the particular restaurant at which the user wishes to make a reservation, a particular time, and a number of individuals in the user's party can be required by such a restaurant reservation service. The context available to the search application 120, or the search engine 150, may not necessarily comprise all of such required information, or it may comprise further information that is not required and, in fact, can be useless to a particular service. Consequently, the scripts, code, or other information of the target-specific context transfer page can utilize only the context that is specific for the particular target with which such a target-specific context transfer page is associated, and with regards to which such a target-specific context transfer page was created.

In another embodiment, context transfer pages, such as the context transfer pages 161 and 162, need not be target-specific. Instead, context transfer pages can utilize protocols that can be established for the transfer of context. Such protocols can be universally applicable, or they can be specific to particular applications, industries, service categories, or other like delineations. For example, one protocol can be established for the transfer of context applicable to airline reservation services while another protocol can be established for the transfer of context applicable to restaurant reservation services. Such established protocols can specify specific nomenclature and formatting for specific types of data that are to be transferred as context. For example, date data can comprise "month", "day" and "year" categories that can accept information in, for example, two or four digit formatting. In such an embodiment, a context transfer page, rather than reformatting contextual data into the formatting relevant to a specific target, can simply reformat the contextual data in accordance with a relevant, already established, protocol and the target can, through its own implementation of the same protocol, accept such contextual information.

Once a context transfer page has filtered out, or otherwise reformatted, any context that it received, such as via the communication 133 illustrated in the system 100 of FIG. 1, the context transfer page can proceed to communicate with a target, such as a particular service being offered over the network 190, and can provide such context information to that target. For example, as illustrated by the system 100 of FIG. 1, a service server computing device 170 can host a service web server 180 that can provide services over the network 190, such as the movie ticket purchasing service, or restaurant reservation service, described above. A context transfer page, such as the context transfer page 161 can then communicate with such a service web server 180, such as via the communication 134, to provide to the service web server 180 the context that was reformatted by the context transfer page 161.

In one embodiment, the context transfer page 161 can comprise deep links into, for example, the website being hosted by the service web server 180. For example, if the service web server 180 was hosting a restaurant reservation service, individual elements, such as individual web pages, of such a service may be associated with specific restaurants. Consequently, a deep link available to the context transfer page 161 can enable such a page to derive, from the context received from the search application 120, an identification of a restaurant to which the user is attempting to make a reservation, and the context transfer page 161 can provide further context, such as the date and time at which the user would like to make the reservation, directly to the webpage, or other entity of the web server 180, that is specifically associated with that restaurant. For example, in response to the user's query, transmitted via the communication 131, the search engine 150 can have identified multiple restaurants that the search engine 150 can have deemed to be responsive to the user's query. For each restaurant, the link to a context transfer page, such as the context transfer page 161, can have comprised a transfer of context that comprised, not only information from the user's query, but also information from the results, such as, for example, the name of a specific restaurant. The user can then select a particular restaurant by activating the associated link. That link can provide for the communicate, such as in the manner described in detail above, context that can include the name of the particular restaurant with which that link was associated, together with other context, such as have been derived from the user's query, such as, for example, the date and time at which the user would like to make the reservation.

In another embodiment, although not specifically illustrated in the system 100 of FIG. 1, the context transfer pages, such as the context transfer pages 161 and 162, need not transfer context to a service web server 180. Instead, in such another embodiment, context transfer pages can transfer contextual information to another application program that can be executing on the mobile computing device 110. For example, as will be recognized by those skilled in the art, some services that were traditionally offered through an interface provided by, for example, a service web server, such as the service web server 180, are now also offered through interfaces provided by locally executed application programs. In such a manner, an interface for the offered services can be tailored to a specific environment, such as the mobile computing device. In such an embodiment, communication with such locally executed application programs, rather than proceeding directly, as in the case of the communications 134 and 135 of FIG. 1, can, instead, initially proceed through an application, such as the application 120, that can invoke, or otherwise instantiate, an appropriate application on the mobile computing device 110 and initiate communications between such an application and an appropriate context transfer page.

In one embodiment, a context transfer page can further provide, such as to a service web server 180 or a locally executed application program, a return link or other identifier with which the service web server 180 can return information back. Such a return link can specify the context transfer page that initiated the communications, such as the context transfer page 161, or can specify a different context transfer page, such as the transfer page 162, both shown in the system 100 of FIG. 1. The return link can further specify a protocol to be utilized to provide the returned context a web page, or a proprietary application program that can execute on the mobile computing device 110. In doing so, the return link can "hide" the return protocol from the target, thereby minimizing any investment, by the target, into the development of code or customized logic to support such a protocol. For purposes of illustration, in the example illustrated by the system 100 of FIG. 1, the service web server 180 can be instructed to return information to the context transfer page 162, and, as a result, the service web server 180 can provide such information to the context transfer page 162 via the communication 135, as shown. Returned information can include, for example, confirmation numbers, information regarding particular dates and times at which a reservation may have been made, or other like information. As before, such information can be provided in a variety of mechanisms, including, for example, as the values associated with name value pairs appended to the return link.

The context transfer page that receives such a return link can then parse the context provided and can appropriately instruct, or direct, the performance of one or more user convenience functions on the mobile computing device 110. For example, in its simplest form, the context transfer page 162 can simply cause the search application 120 to display a result, such as a result received via the communication 136, to a user. In another embodiment, however, the context transfer page 162 can cause the search application 120 to perform other actions on the mobile computing device 110. For example, the search application 120 can invoke a calendar application 125, as illustrated by the communication 137, and can, within the context of the calendar application 125, create a calendar entry with the context information that was originally sent by the service web server 180. Other user convenience functions are similarly contemplated. For example, the search application 120 could automatically generate texts or e-mails to other users, such as other users that may be part of the dinner party. Alternatively, as another example, the search application 120 could invoke a mapping application to provide the user of the mobile computing device 110 with turn by turn directions to, for example, a movie theater at which the user had just purchased tickets.

Figure 2:
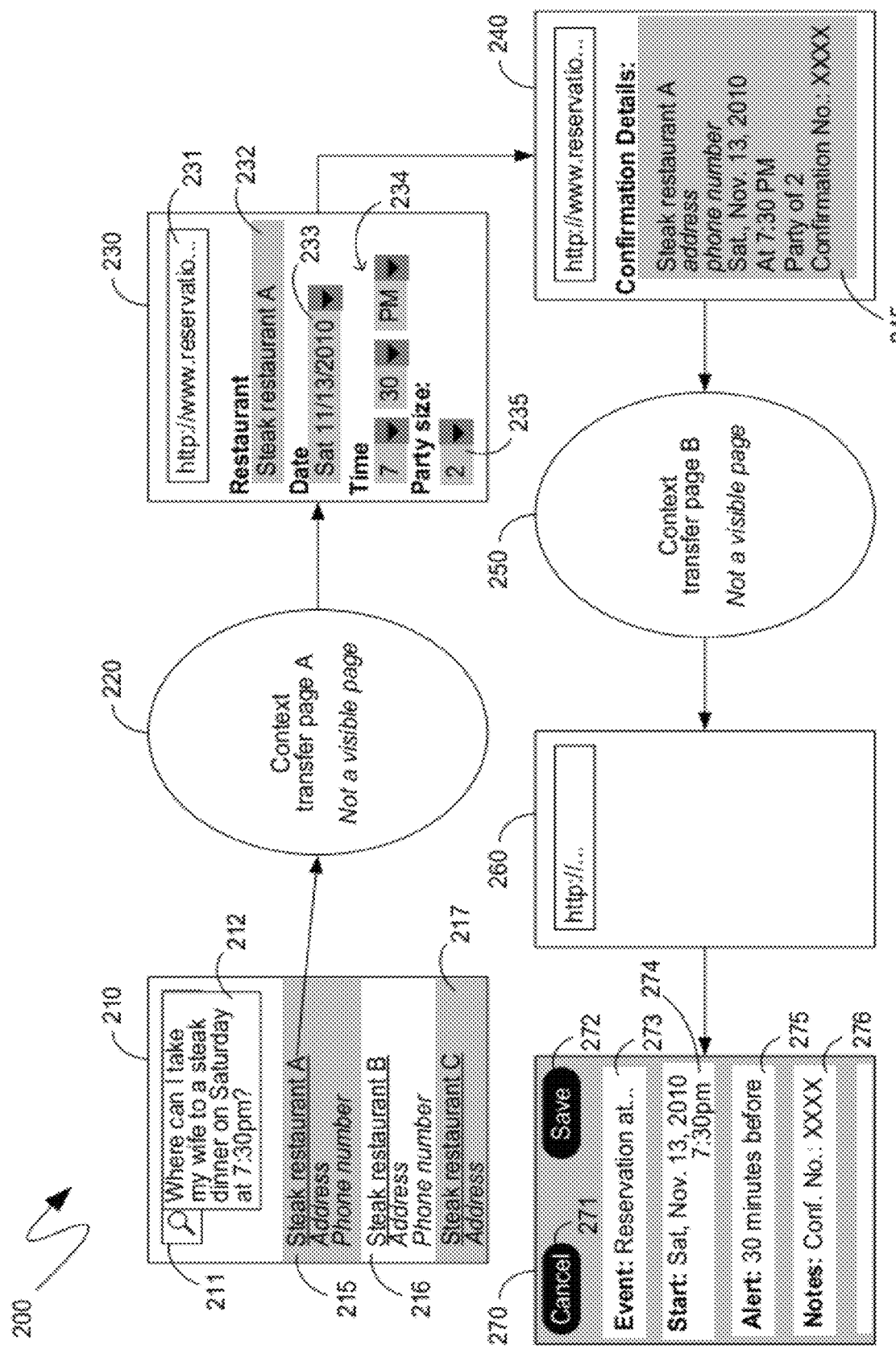
FIG. 2 is a flow diagram of an exemplary series of elements and interfaces relevant to the provision of context to targets.

Turning to FIG. 2, the system 200 shown therein illustrates an exemplary series of actions and user interfaces that can further illuminate the above descriptions within the context of a specific example. As before, such an example is meant to be illustrative only, and is not meant to limit the embodiments described to the specifics of the example.

Initially, as shown by the system 200 of FIG. 2, an application executing on a mobile computing device can present a user interface 210 that can enable a user to search for, or otherwise locate, information or services that may be desired by the user. Typically, the user interface 210 can comprise a text entry area 211 that can enable a user to enter information describing what the user is searching for, or otherwise desires. In the particular example shown in the system 200 of FIG. 2, the user can have entered the text 212 "Where can I take my wife to a steak dinner on Saturday at 7:30 pm?" As will be recognized by those skilled in the art, such text can comprise sufficient information to enable a search service to recognize that the user is attempting to find, for example, a steak restaurant. Consequently, in response to the user entering the text 212 into the application presenting the user interface 210, the application presenting the user interface 210 can return a series of results 215, 216 and 217 that can identify one or more entities believed to be responsive to the user's request.

Typically, results to search requests, such as the results 215, 216 and 217, comprise links, or other identifiers, that can be utilized to identify and retrieve data from one or more network-accessible resources. In one embodiment, as indicated previously, the results 215, 216 and 217 can comprise links, not to the network-accessible resources themselves, but rather to context transfer pages associated with those resources. Thus, within the specific example illustrated by the system 200 of FIG. 2, the results 215, 216 and 217 could, traditionally, have referenced a network-based restaurant reservation service that enables users to make reservations for the restaurants listed. Instead, in one embodiment, the results 215, 216 and 217 can comprise links to context transfer pages that are designed to reformat context obtained through the links, such as, for example, as a combination of name value pairs, and utilize such context to pre-populate or already fill in certain aspects, or certain information, required by the network-based restaurant reservation service.

For example, a link associated with the result 215 can both identify the context transfer page 220 and can provide, to that page, available context. For example, the term "Saturday" in the search query can be identified, to the context transfer page 220, in the form of "date=11/13/2010". More specifically, a search service can have identified the term "Saturday" in the search query to be a reference to the immediately upcoming Saturday. Consequently, when forming the results of the search to be provided, such as in the user interface 210, the search engine can have formed a link to be associated with the search result 215 that specified, not only a link to the context transfer page 220, but further specified at least one name/value pair conveying this date information, such as, for example, "date=11/13/2010". Similarly, the term "7:30 pm" in the search query can be understood to be a reference to a time, and the search engine, again when forming the link to be associated with the result 215, can further attach another name/value pair to transfer this context, such as, for example, a name/value pair in the form of "time=1930".

The context transfer page 220 can receive this context, such as, for example, in the form of the name/value pairs, and can reformat such context in a manner appropriate for the inputs expected by the network-based restaurant reservation service. In one embodiment, the context transfer page 220 can, after reformatting any context it received, redirect to a specific webpage, or other like entity, associated with the network-based restaurant reservation service. Such a redirection can be performed in accordance with, for example, webpage redirection mechanisms that are well known in the art. As part of such a redirection, the context transfer page 220 can provide the reformatted content to the network-based restaurant reservation service. For example, the context transfer page 220 can generate its own name/value pairs to provide context to the network-based restaurant reservation service.

From the perspective of a user of a mobile computing device, the context transfer page 220 need not comprise any visible manifestation. Consequently, from that user's perspective, the selection of a link, such as, for example, the link associated with the exemplary search result 215 can result in the presentation of the user interface 230 representing a webpage, or other like entity of the network-based restaurant reservation service, having certain information pre-populated for the user. Thus, for example, the user interface 230 can comprise an address bar 231, such as, for example, is typically found in a mobile network browser application program, and can further comprise various fields of information that, typically, the user would be required to fill in themselves. However, in the present example, the context transfer page 220 can have already provided the relevant context to the network-based restaurant reservation service that can host a webpage, or other like entity, that can be displayed as part of the user interface 230. Thus, as shown, the name of a desired restaurant 232 can already be populated for the user, as can the date 233, the time 234, and even the party size 235. As will be understood by those skilled in the art, and as described in detail above, such information can have been derived from, for example, not only the search terms 212 utilized by the user, but also the responsive results, as determined by a search engine, such as, for example, the name of a responsive restaurant, or other information that a search application, or a search engine, or a combination thereof, may be aware of.

In one embodiment, the user can then proceed to interact with the target network-based service. For example, in the specific example illustrated by the system 200 of FIG. 2, the user can utilize the user interface 230 to edit, delete, or otherwise modify the information that was pre-populated, make the reservation that is illustrated, or to otherwise interact with the target network-based service. Ultimately, a user interface 240 can be presented providing, for example, confirmation details 245 of the user's reservation.

As indicated previously, in one embodiment, the context transfer page 220 can have provided, to its target network-based service, a return link that the service is to utilize to return further context, such as, for example, the confirmation details 245. In one embodiment, such a return link can also be provided as part of a resource identifier, in a manner analogous to that in which the context itself is provided. The return link specified by the context transfer page 220 need not necessarily identify that same page. For example, a return link specified by the context transfer page 220 can, instead, specify a context transfer page 250 as the return link. In such a case, the target network-based service can provide, to the specified context transfer page 250, additional context, such as, for example, the confirmation details 245.

Like the context transfer page 220, the context transfer page 250 can, also, reformat any context that it receives, such as, for example, from the target network-based service. In one embodiment, the context transfer page 250 can simply provide the confirmation details 245 in a visible manner to the user of a mobile computing device. In another embodiment, however, the context transfer page 250 can utilize the capabilities of, for example, a mobile web browser application program, or other like application program, that is executing on the mobile computing device to perform user convenience functions, for the user, on the mobile computing device. For example, as shown by the example illustrated by the system 200 of FIG. 2, the context transfer page 250 can utilize a mobile web browser, whose user interface is shown as the user interface 260, to invoke, for example, a calendar application and provide context from the confirmation details 245 to the calendar application. From the perspective of a user of the mobile computing device, the context transfer page 250 need not comprise any visible aspect. Consequently, from the perspective of that user, the web browser, or other suitable application, may briefly display a user interface, such as the user interface 260, before launching another application program on the mobile computing device. In the specific example illustrated by the system 200 of FIG. 2, such another application program can be a calendar application program that can present the user interface 270.

As can be seen, various aspects of the confirmation details 245 can be pre-populated for the user in the calendar application user interface 270. Thus, for example, the calendar application can have been invoked and a new event can have been created. Subsequently, information regarding the restaurant can be entered into the event field 273, while information regarding the date and time can be entered into the start field 274. Similarly, a confirmation number can be provided in notes field 276, and, an alarm can even be set as indicated by the alert field 275. As before, the information to pre-populate such fields can be provided via name/value pairs that can be appended to resource identifiers, or via any other like mechanism. Because the context transfer page 250 is, the context that is provided can be specific to the particular network-based service being provided by the target. Plus, for example, a target that provides network-based restaurant reservations can be associated with context transfer pages that can seek to derive, and pass along, context that can enable the pre-population of fields typically found in a calendaring application. Other network-based services may provide different types of contexts that may be appropriately handled by context transfer pages that are specific to those targets. For example, a network-based airline reservation service can be associated with a context transfer page that can cause the invocation of an e-mail program to e-mail itineraries to those individuals in the mobile computing devices address book whose names match the individuals for whom airline tickets were purchased.

As before, the pre-populated information can remain available for use or modification. Thus, in the example shown in the system 200 of FIG. 2, the user can still select a cancel button 271 in the user interface 270 if the user does not desire to have the restaurant reservation information saved in their calendar. Conversely, the user can also edit or delete such pre-populated information, as appropriate, prior to selecting the save button 272 to save such information into their calendar.

Although not specifically illustrated, context that can be transferred in the manner described in detail above also includes context that can be derived from prior activities by the user. Thus, for example, if the user whose actions were exemplarily illustrated by the system 200 of FIG. 2, were to subsequently search for movie tickets for the same day, some of the context that can be provided can include information regarding the location of the restaurant at which the user had made reservations, and the time at which the user had made those reservations. Such context can then enable target network-based services to further tailor their behavior to the user's likely needs.

As can be seen, by providing context both to and from target network-based services, the amount of information that a user may be required to enter via sub-optimal user input entry peripherals, such as those typically associated with mobile computing devices, can be minimized. In one embodiment, however, context transfer pages, such as those described in detail above, can comprise visible elements that can request additional context from a user. While, in those cases, a user may still be required to utilize intentionally sub-optimal user input entry peripherals, the context transfer pages can still provide benefit because they can collect information from the user in a manner that is easy for the user to perceive and interact with in the context of a mobile computing device. For example, such context transfer pages can minimize the amount of high-bandwidth elements that are shown to the user, or they can be designed to provide for maximum legibility within a small screen. Consequently, a target network-based service can collect information from a user in a manner that is convenient for the user, within the context, for example, of a mobile computing device, without the target network-based service having to invest in the creation of, for example, mobile computing device specific presentations. One scenario for the utilization of such an embodiment is in the context of payment, where a user can provide payment information via a context transfer page, but then the context transfer page can transfer such payment context to a target network-based service that can process such information.

Figure 3:
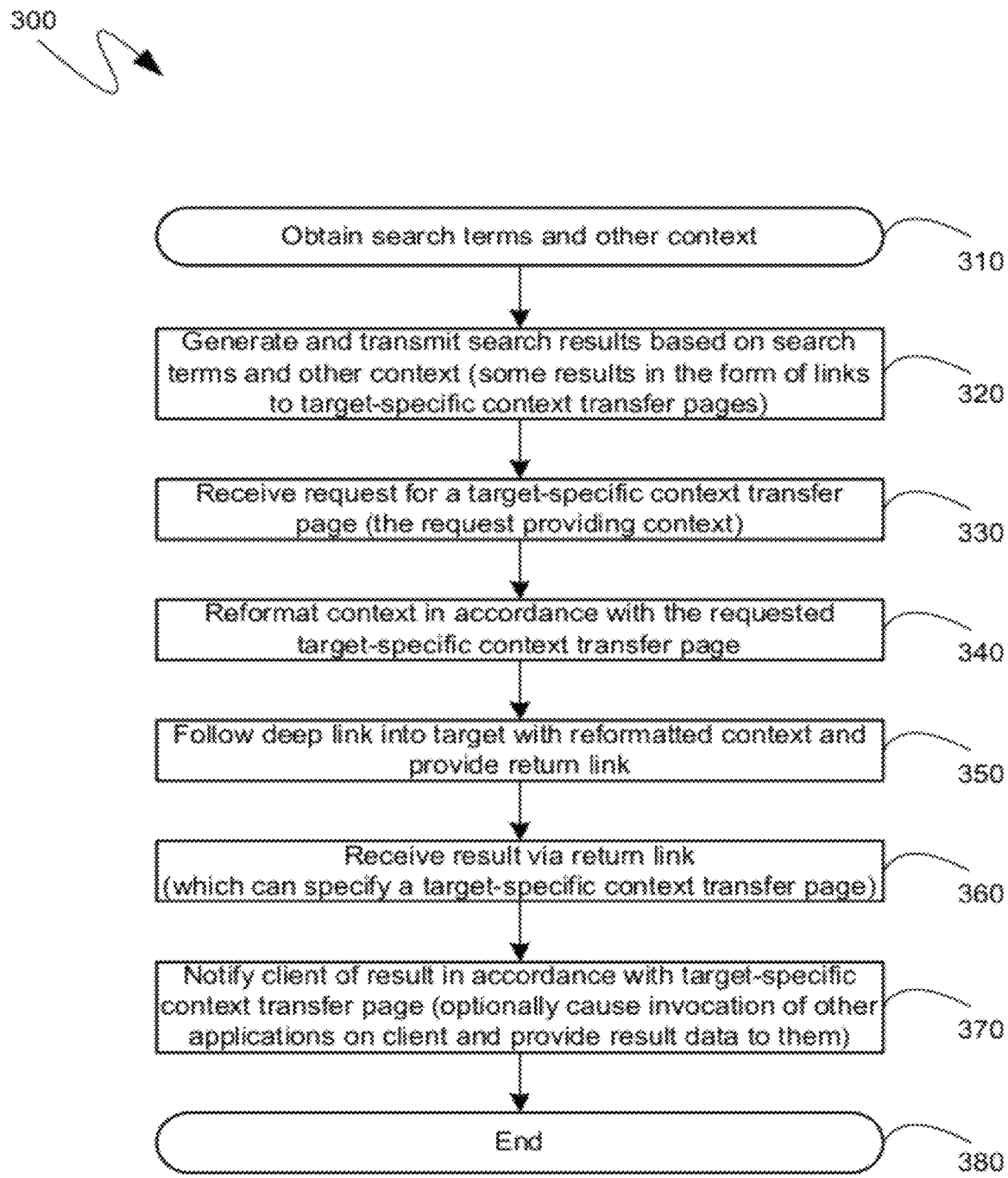
FIG. 3 is a flow diagram of an exemplary operation of the provision of context to targets.

Turning to FIG. 3, the operation of a server computing device that can provide for the above described functionality, is illustrated by the flow diagram 300 shown in FIG. 3. Initially, at step 310, search terms and other context can be received, such as, for example, from a dedicated application executing on a mobile computing device, or through a web interface, such as could have been provided to a user of a mobile computing device by, for example, a mobile web browser application. As indicated previously, the context received at step 310 can comprise not only the search terms, but other information, such as, for example, the GPS coordinates of the mobile computing device from which the search terms were received, the user's prior search terms or prior network activity, and other like context information.

At step 320, a search service, or search engine, can identify one or more search results based on the search terms in other context that was received at step 310. As part of the identification of the one or more search results, at step 320, the search engine can determine whether or not any of the search results are associated with one or more context transfer pages. If they are, the search engine can formulate appropriate links to such context transfer pages to pass along the context that the search engine, the mobile computing device, or any combination thereof, is aware of. At step 330, a request for one of those context transfer pages can be received utilizing the links generated at step 320, which can, such as in the manner described in detail above, provide context to such a context transfer page. At step 340, the scripts, code, or other information on the context transfer page can be executed to reformat the context, select which context to utilize, and perform other like activities. At step 350, then, the context transfer page can redirect to a target network-based service, providing the reformatted context and providing a return link for that target to utilize to return further context, such as, for example, a confirmation number.

Once the user completes their interactions with the target network-based service, at step 360, a result can be received by a context transfer page that was specified by the return link was provided at step 350. Again, the scripts, code, or other information on such a specified return content transfer page can be executed, or can otherwise reformat the received context in an appropriate manner. At step 370, that content transfer page can result in the user being notified of, for example, a confirmation number, or a success or failure of a transaction. Optionally, also as part of step 370, other application programs can be invoked on the mobile computing device and the received context can be provided to those application programs to pre-populate fields, or otherwise aid in the performance of user convenience functions. The relevant processing can then end at step 380.

Figure 4:
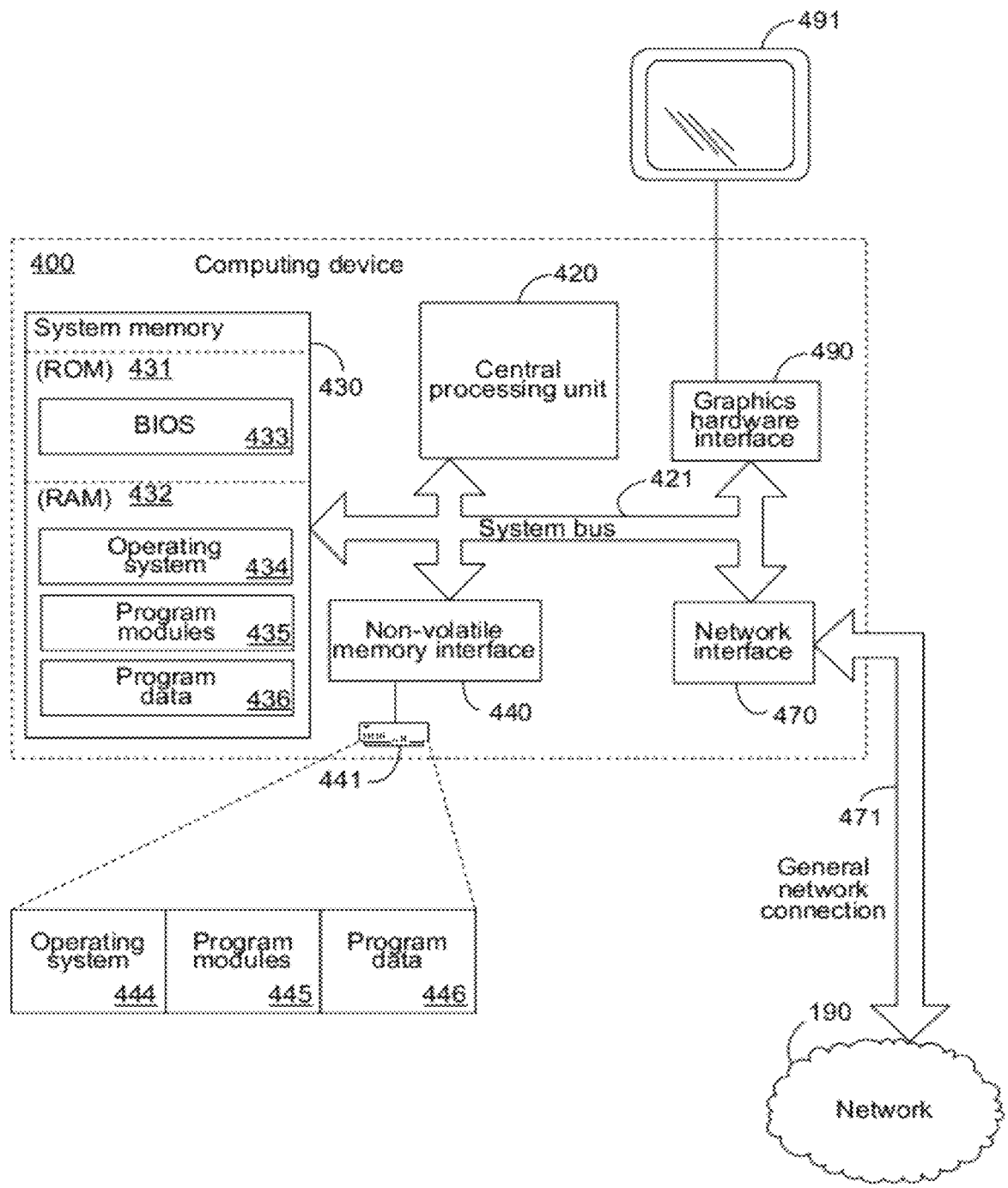
FIG. 4 is a block diagram of an exemplary computing device.

Turning to FIG. 4, an exemplary computing device 400 is illustrated. The exemplary computing device 400 can be any one or more of the client computing device 110 and the server computing devices 140 and 170 illustrated in FIG. 1, whose operations were described in detail above. For example, the computing device 400 can be a cellular telephone, personal digital assistant, tablet computing device or other like mobile computing device. Similarly, the exemplary computing device 400 can be a server computing device or a computing device that can be executing one or more processes that can represent the server computing devices 140 and 170 illustrated in FIG. 1, such as, for example, by executing one or more processes that create virtual computing environments that can provide for the operations detailed above. The exemplary computing device 400 of FIG. 4 can include, but is not limited to, one or more central processing units (CPUs) 420, a system memory 430, that can include RAM 432, and a system bus 421 that couples various system components including the system memory to the processing unit 420. The system bus 421 may be any of several types of bus structures including a memory bus or memory controller, a peripheral bus, and a local bus using any of a variety of bus architectures. The computing device 400 can optionally include graphics hardware, such as for the display of visual user interfaces, including, but not limited to, a graphics hardware interface 490 and a display device 491. Depending on the specific physical implementation, one or more of the CPUs 420, the system memory 430 and other components of the computing device 400 can be physically co-located, such as on a single chip. In such a case, some or all of the system bus 421 can be nothing more than silicon pathways within a single chip structure and its illustration in FIG. 4 can be nothing more than notational convenience for the purpose of illustration.

The computing device 400 also typically includes computer readable media, which can include any available media that can be accessed by computing device 400 and includes both volatile and nonvolatile media and removable and non-removable media. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 400. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 430 includes computer storage media in the form of volatile and/or nonvolatile memory such as read only memory (ROM) 431 and the aforementioned RAM 432. A basic input/output system 433 (BIOS), containing the basic routines that help to transfer information between elements within computing device 400, such as during start-up, is typically stored in ROM 431. RAM 432 typically contains data and/or program modules that are immediately accessible to and/or presently being operated on by processing unit 420. By way of example, and not limitation, FIG. 4 illustrates the operating system 434 along with other program modules 435, and program data 436.

The computing device 400 may also include other removable/non-removable, volatile/nonvolatile computer storage media. By way of example only, FIG. 4 illustrates the hard disk drive 441 that reads from or writes to non-removable, nonvolatile media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440.

The drives and their associated computer storage media discussed above and illustrated in FIG. 4, provide storage of computer readable instructions, data structures, program modules and other data for the computing device 400. In FIG.

4, for example, hard disk drive 441 is illustrated as storing operating system 444, other program modules 445, and program data 446. Note that these components can either be the same as or different from operating system 434, other program modules 435 and program data 436. Operating system 444, other program modules 445 and program data 446 are given different numbers hereto illustrate that, at a minimum, they are different copies.

The computing device 400 can operate in a networked environment using logical connections to one or more remote computers. The computing device 400 is illustrated as being connected to the general network connection 471 through a network interface or adapter 470 which is, in turn, connected to the system bus 421. In a networked environment, program modules depicted relative to the computing device 400, or portions or peripherals thereof, may be stored in the memory of one or more other computing devices that are communicatively coupled to the computing device 400 through the general network connection 471. It will be appreciated that the network connections shown are exemplary and other means of establishing a communications link between computing devices may be used.

As can be seen from the above descriptions, mechanisms for passing context to minimize user input have been enumerated. In view of the many possible variations of the subject matter described herein, we claim as our invention all such embodiments as may come within the scope of the following claims and equivalents thereto.

We claim:

1. One or more computer-readable storage media comprising computer-executable instructions for pre-populating a target with context information, the computer executable instructions directed to steps comprising:
    receiving an identification of a target that is deemed to be responsive to a user query;
    determining a target-specific format by which the identified target can receive information to populate information-entry fields presented by the target;
    identifying a first context transfer page that reformats context information into the determined target-specific format;
    obtaining, at least in part from the user query, context information in a different format from the determined target-specific format;
    generating a link to the first context transfer page, the generated link comprising the obtained context information in the different format; and
    presenting the generated link as if it were a link to the target.

2. The computer-readable storage media of claim 1, wherein the first context transfer page is a target-specific context transfer page comprising functionality specific to the identified target.

3. The computer-readable storage media of claim 1, wherein the obtained context information further comprises information associated with previously received queries that were received from a same user as the user query.

4. The computer-readable storage media of claim 1, wherein the first context transfer page redirects to a deep link into the identified target, the deep link being identified with reference to the obtained context information.

5. The computer-readable storage media of claim 1, comprising further computer-executable instructions for: receiving a request for additional context information from the first context transfer page; and generating, in response to the requesting, the additional context information; wherein the first context transfer page pre-populates at least a portion of the identified target with the additional context information.

6. The computer-readable storage media of claim 1, wherein the computer-executable instructions for generating the link to the first context transfer page comprise computer-executable instructions for generating a return link identifying a second context transfer page, the return link being included with the generated link to the first context transfer page.

7. The computer-readable storage media of claim 1, wherein the generated link to the first context transfer page itself comprises the obtained context information in name/value pairs.

8. A system for pre-populating a target with context information, the system comprising:
    an application program for execution on a mobile client computing device, the application program being configured to receive a query from a user of the mobile client computing device; transmit the received query to a search server computing device and present, to the user, results, responsive to the query, that are received from the search server computing device; and
    the search server computing device comprising one or more computer-readable media comprising computer-executable instructions for:
    receiving the query from the application program;
    identifying a target deemed to be responsive to the query;
    determining a target-specific format by which the identified target can receive information to populate information-entry fields presented by the target
    identifying a first context transfer page that reformats context information into the determined target-specific format;
    obtaining, at least in part from the user query, context information in a different format from the determined target-specific format;
    generating a link to the first context transfer page, the generated link comprising the obtained context information in the different format; and
    transmitting, to the application program, as part of results responsive to the query, the generated link as if it were a link to the target.

9. The system of claim 8, wherein the application program is further configured to collect additional context and transmit the additional context with the received query to the search server computing device; and wherein further the generated link further comprises the additional context information.

10. The system of claim 8, wherein the context information further comprises information associated with previously received queries from the application program.

11. The system of claim 8, wherein the first context transfer page redirects to a deep link into the target, the deep link being identified with reference to the obtained context information.

12. The system of claim 8, wherein the one or more computer-readable media comprise further computer-executable instructions for: receiving a request for additional context information from the first context transfer page; and generating, in response to the requesting, the additional context information; wherein the first context transfer page pre-populates at least a portion of the target with the additional context information.

13. The system of claim 8, wherein the one or more computer-readable media comprise further computer-executable instructions for: receiving returned context information from the target via the return link; and wherein further the application program is further configured to invoke at least one other application program on the mobile client computing device and populate, with the returned context information, at least a portion of the at least one other application program.

14. The computer-readable storage media of claim 6, comprising further computer-executable instructions for: receiving returned context information from the identified target via the return link; causing the invocation of at least one application program on a client from which the query was received; and causing the population of at least a portion of the at least one application program with the returned context information.

15. A method for pre-populating a target with context information, the method comprising the steps of:
   receiving an identification of a target that is deemed to be responsive to a user query;
   determining a target-specific format by which the identified target can receive information to populate information-entry fields presented by the target;
   identifying a first context transfer page that reformats context information into the determined target-specific format;
   obtaining, at least in part from the user query, context information in a different format from the determined target-specific format;
   generating a link to the first context transfer page, the generated link comprising the obtained context information in the different format; and
   presenting the generated link as if it were a link to the target.

16. The method of claim 15, wherein the context information further comprises information associated with previously received queries that were received from a same user as the user query.

17. The method of claim 15, wherein the first context transfer page redirects to a deep link into the identified target, the deep link being identified with reference to the obtained context information.

18. The method of claim 15, further comprising the steps of: receiving a request for additional context information from the first context transfer page; and generating, in response to the requesting, the additional context information; wherein the first context transfer page pre-populates at least a portion of the identified target with the additional context information.

19. The method of claim 15, wherein the generating the link to the first context transfer page comprises generating a return link identifying a second context transfer page, the return link being included with the generated link to the first context transfer page.

20. The method of claim 19, further comprising the steps of: receiving returned context information from the identified target via the return link; causing the invocation of at least one application program on a client from which the query was received; and causing the population of at least a portion of the at least one application program with the returned context information.

21. The method of claim 15, wherein the generated link to the first context transfer page itself comprises the obtained context information in name/value pairs.

\* \* \* \* \*